United States Patent [19]

Stoutmeyer et al.

[11] 3,917,412

[45] Nov. 4, 1975

[54] ADVANCED HELMET TRACKER USING LATERAL PHOTODETECTION AND LIGHT-EMITTING DIODES

[75] Inventors: Ronald G. Stoutmeyer; William O. Alltop, both of China Lake, Calif.

[73] Assignee: The United States of America as represented by the Secretary of the Navy, Washington, D.C.

[22] Filed: Apr. 11, 1972

[21] Appl. No.: 243,085

[52] U.S. Cl. ............... 356/152; 356/172; 256/150; 250/203 R
[51] Int. Cl.² ...................................... G01B 11/26
[58] Field of Search .................. 356/150, 152, 172; 250/203 R

[56] References Cited
UNITED STATES PATENTS

| | | | |
|---|---|---|---|
| 3,664,748 | 5/1972 | Bezu | 356/152 |
| 3,678,283 | 7/1972 | La Baw | 356/152 |

*Primary Examiner*—Maynard R. Wilbur
*Assistant Examiner*—S. C. Buczinski
*Attorney, Agent, or Firm*—R. S. Sciascia; Roy Miller; Robert W. Adams

[57] ABSTRACT

A means for sensing the pilot's line-of-sight in an aircraft, including two light detectors mounted on the cockpit frame and two light emitters mounted on the pilot's helmet. Each detector senses light from each emitter and the line-of-sight is determined from the intersection of the thus defined planes.

5 Claims, 2 Drawing Figures

ADVANCED HELMET TRACKER USING LATERAL PHOTODETECTION AND LIGHT-EMITTING DIODES

BACKGROUND OF THE INVENTION

In the past the aircraft pilot was not used to his full capability. An objection which was commonly raised by pilots is that they could scan the terrain but had very limited techniques for directing a tracking system, for example, to a detected object. The pilot could point avionic systems only with his aircraft. By having the capabilities of directing an aircraft tracking system, for instance, to look at an object off aircraft boresight, the pilot's flight path selection could be more flexible. Until recently, the imposing restriction has been the pilot's inability to communicate direction to on-board systems and other on-board personnel.

Given that the pilot has a sight mounted on his helmet that is independent of eye movement, then the problem of communicating direction narrows to one of tracking his helmet. That is, sensing the aim direction of the helmet. An example of such a helmet mounted sight is the sight disclosed in U.S. patent application, Ser. No. 53,724, by Reed A. Farrar, now U.S. Pat. No. 3,633,988.

Important considerations, other than accuracy, for any helmet tracking scheme are: Pilot's safety and comfort, and cockpit space. Pilot's safety and comfort impose restrictions in helmet weight, mechanical connections to the helmet, and fracturable materials near the eyes. Cockpit space restricts the use of mechanical linkage and optical levers. Of course, in any design the pilot's vision should not be obstructed by objects on the helmet or in the cockpit.

Recently a number of systems which can be used to measure the pilot's line-of-sight have been invented. On such system is the device disclosed by Robert Abbey and David S. Lane in U.S. Pat. No. 3,375,375, entitled "Orientation Sensing Means Comprising Photodetectors and Projected Fans of Light," and assigned to Honeywell Incorporated. The patent to Robert Abbey et al. discloses a system having at least two rotating fans of light, two system-spatially fixed photodetectors, and two photodetectors mounted on the object. Another system is that disclosed in U.S. patent application, Ser. No. 82,880, by Kenneth P. LaBaw entitled "Optical Helmet Tracker" filed Oct. 22, 1970, now U.S. Pat. No. 3,678,283, wherein the approach is different than that disclosed in the patent to Robert Abbey et al. and the number of components has been reduced to at least two light sources and one photodetector system-spatially fixed, and one light source and one photodetector mounted on the object.

DESCRIPTION OF THE PREFERRED EMBODIMENT

Figure 1:
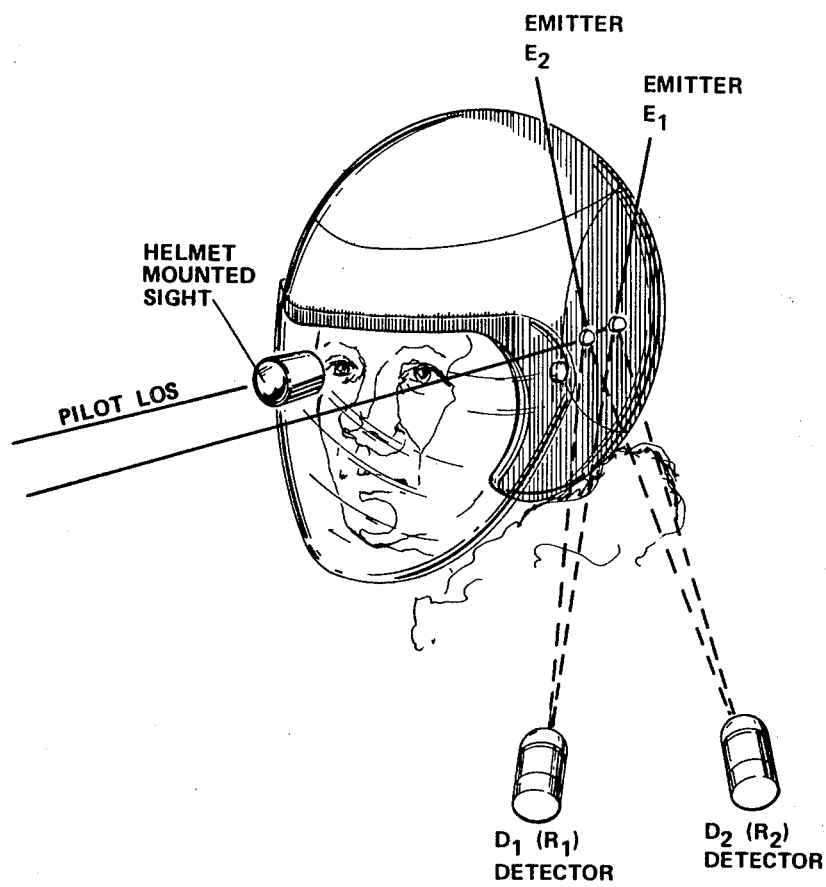
FIG. 1 is a plan view of the preferred embodiment of the present invention.

The present invention is a system which may be used within an aircraft cockpit for indicating the pilot's line-of-sight regardless of the position of his helmet, shown in FIG. 1. In such a configuration the present invention would include two light emitters on the helmet and two photodetectors fixedly mounted in the cockpit, i.e., system-spatially fixed. The intersection of the plane defined by the first emitter and the two detectors with the plane defined by the second emitter and the two detectors, forms a line which indicates the pilot's line-of-sight. That is, once the transmitters are positioned on the helmet such that they define a line parallel to the pilot's line-of-sight, the problem becomes one of measuring the position and orientation of the imaginary line. The intersection of the planes defined by emitter $E_1$ and detectors $D_1$ and $D_2$, and emitter $E_2$ and detectors $D_1$ and $D_2$ is the imaginary line. Therefore, by measuring the intersection of the two planes the pilot's line of sight can be determined.

The preferred embodiment of the present invention may consist of a dual system having four light emitting diodes, two of which are mounted on each side of the pilot's helmet parallel to his line-of-sight as determined by an appropriate collimated reticle, such as the sight disclosed in U.S. patent application, Ser. No. 53,724 by Reed A. Farrar, entitled "Holographic Sight." Also included are four photodetectors mounted in the cockpit, forward of the pilot, looking back at him so as to have intersecting fields of view forming a volume of simultaneous coverage around his normal head-motion box. And finally, a computer is included for solving the following vector and matrix algebra equations.

FIG. 1 shows one section of the preferred embodiment of the present invention, which preferred embodiment may include any number of sections to reliably accomplish the purpose of the intended application, such as the two section system mentioned immediately above. The minimum number of components which will measure the pilot's line-of-sight are two emitters and two detectors, as shown in FIG. 1.

In FIG. 1, if each detector is capable of quantifying a vector to each emitter, two vectors from $D_1$ can be derived, the cross product of which defines the plane containing $D_1$, $E_1$, $E_2$. Simultaneously, similar results can be obtained for $D_2$.

The two planes thus determined are necessarily defined in the coordinates of their respective detectors and, when the preferred embodiment is used in an aircraft, should be rotated to a common coordinate system which is best chosen around the Armament Datum Line of the aircraft. The respective matrix rotation for $D_1$ and $D_2$ are $R_1$ and $R_2$, shown in FIG. 1. The final cross-product involving the rotated planes results in a vector parallel to the line-of-sight which is properly referenced to the coordinate system of the aircraft. The vector is defined as follows:

$$R_1 \, (\vec{D_1E_1} \otimes \vec{D_1E_2}) \otimes R_2 \, (\vec{D_2E_1} \otimes \vec{D_2E_2}) \parallel \vec{E_1E_2}$$

From the previous discussion it is clear that vector direction information, and not angle direction information, is needed from the detector. The detector can be anything that will provide $x$ and $y$ coordinate outputs, such as a lateral photodetector, diode matrix detector, vidicon, etc. Therefore, the approach contemplated is to generate direction cosines from the outputs of the lateral photodetectors, i.e., obtain unity vector direction information from the lateral photodetector outputs.

Figure 2:
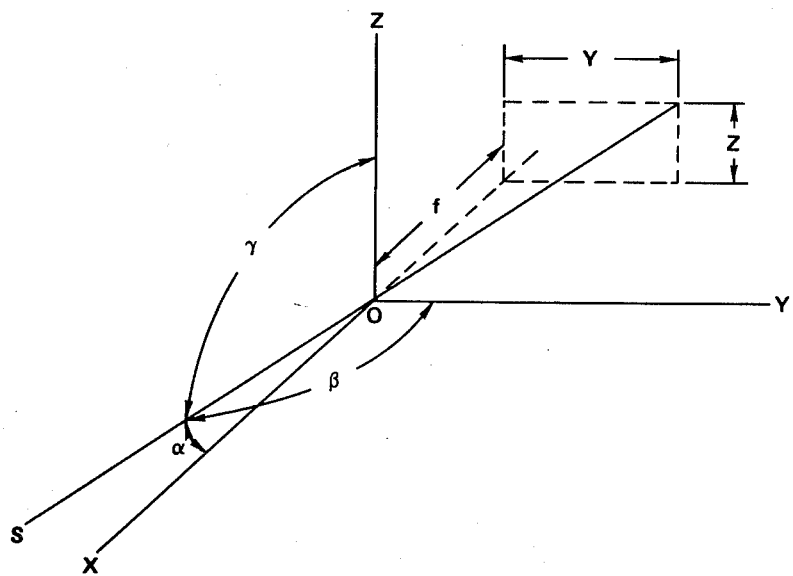
FIG. 2 is a schematic diagram of the geometrical relationships used by the preferred embodiment of the present invention.

Consider the effect of a common tangent lens or pinhole lens approximation on a two axis detector in the FIG. 2 coordinate system, where the pinhole is located at origin O and a source at S. The pinhole or lens has a transfer function described by $$\tan \alpha = \sqrt{y^2 + z^2}/f$$

where $f$ is the focal length of the lens.

It's clear that the $y, z$ spot position on the detector and the $f$ value of the lens are the direction numbers of the vector SO and are precisely what is required for the previously mentioned solution. If normalized, these results in direction cosines, or a unity vectors, and are as follows:

$\cos \alpha = f/\rho$
$\cos \beta = y/\rho$
$\cos \gamma = z/\rho$ where $$\rho = \sqrt{f^2 + y^2 + z^2}$$

As mentioned, a simple tangent lens can be used. Other lens systems can be used if they satisfactorily perform the necessary function. And, the transfer functions are well established. The diameter, focal length and aperture of the lens system should be compatible with the detector size, sensitivity, field-of-view, and the specified light source.

Detectors can be of the Schottkey Barrier or diffused junction types. Other means are also acceptable if they satisfactorily perform the intended function (see above). Because of the intended usage it is important to use electrically centered and symmetrical detectors. To obtain optimum results the optical axis of the lens should be coincident with a normal to the detector at the point of electrical zero.

The general operation of the present invention is as follows: Light emitted from emitter $E_1$ is detected by detectors $D_1$ and $D_2$, which respectively measure the direction-cosines to emitter $E_1$. Since the orientation of detectors $D_1$ and $D_2$ are known, and the directioncosines from each detector to emitter $E_1$ is measured, the plane including the point occupied by emitter $E_1$ and detectors $D_1$ and $D_2$ can be determined by mathematical analysis performed by a computer. Likewise, the plane containing the points occupied by emitter $E_2$ and detectors $D_1$ and $D_2$ can be determined. The intersection of the two planes defines a line which is parallel to the pilot's line-of-sight. By performing its programmed mathematical computations, the computer describes and locates the line and, thereby, the pilot's line-of-sight.

Some advantages of the present invention are: Roll as a degree of freedom, translatory position of the pilot's head, and the $x, y, z$ position of the detectors do not enter into the solution of the problem. Two detectors and two light sources provide sufficient information for a line-of-sight solution. Additional detector-emitter groups provide additional measurements which may be averaged to determine the pilot's line-of-sight. The location of the detectors in the cockpit is flexible. The computer requirements are relatively simple. The present invention provides a "large operator head-box" and large angular coverage; is simple; and, has no moving parts. And, the helmet mass and volume are only insignificantly increased.

What is claimed is:

1. An optical tracker system for determining the position and orientation of an operator's headgear, comprising:

a sight that is independent of said operator's eye movement mounted on said headgear;

first illuminating means coupled to said operator's headgear for movement therewith, for providing illumination;

second illuminating means coupled to said operator's headgear for movement therewith, for providing illumination;

first photodetecting means system-spatially fixed for detecting the illumination of said first and second illuminating means and providing outputs in response thereto;

second photodetecting means system-spatially fixed for detecting the illumination of said first and second illuminating means and providing outputs in response thereto;

such that the outputs of said first and second photodetecting means indicate the position and orientation of said headgear and, thereby, the operator's line-of-sight.

2. The tracker of claim 1 wherein the points on the headgear occupied by said first and second illuminating means define a line which is parallel to the operator's line-of-sight.

3. The tracker of claim 2 wherein the photodetecting means sense the direction to the illumination source of the detected illumination, and the tracker further comprises electronic processing means coupled to the outputs of said first and second photodetecting means for processing their outputs and measuring the intersection of the planes defined by the first photodetecting means and the first and second illuminating means, and the second photodetecting means and the first and second illuminating means, which intersection defines a line parallel to the operator's line-of-sight.

4. The tracker of claim 3 wherein said electronic processing means is an aircraft, on-board computer and said operator is the aircraft pilot.

5. The tracker of claim 3 wherein said photodetecting means are lateral photodetectors.

* * * * *